United States Patent
Paspek et al.

(10) Patent No.: US 12,344,799 B2
(45) Date of Patent: *Jul. 1, 2025

(54) METHODS FOR THE PRODUCTION OF INCREASED ANISOTROPIC COKE

(71) Applicant: Arq IP Limited, London (GB)

(72) Inventors: Stephen Paspek, Broadview Heights, OH (US); John Francis Unsworth, London (GB); Jeramie Joseph Adams, London (GB); Seth Taylor Bassham, London (GB)

(73) Assignee: ARQ IP Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/025,755

(22) PCT Filed: Sep. 10, 2021

(86) PCT No.: PCT/US2021/049753
§ 371 (c)(1),
(2) Date: Mar. 10, 2023

(87) PCT Pub. No.: WO2022/056189
PCT Pub. Date: Mar. 17, 2022

(65) Prior Publication Data
US 2023/0348787 A1    Nov. 2, 2023

Related U.S. Application Data

(60) Provisional application No. 63/077,002, filed on Sep. 11, 2020.

(51) Int. Cl.
*C10B 55/02*   (2006.01)
*C10B 57/04*   (2006.01)
*C10B 57/06*   (2006.01)

(52) U.S. Cl.
CPC ............ *C10B 55/02* (2013.01); *C10B 57/045* (2013.01); *C10B 57/06* (2013.01)

(58) Field of Classification Search
CPC ........ C10B 55/02; C10B 57/045; C10B 57/06
See application file for complete search history.

(56) References Cited

U.S. PATENT DOCUMENTS 3,116,231 A  * 12/1963  Adee .......................... C10L 9/08
                                                    201/22
4,082,650 A  *  4/1978  Li ............................ C10B 55/00
                                                    208/106

(Continued)

FOREIGN PATENT DOCUMENTS

| CN | 109504416 A | 3/2019 |
| GB | 866859 | 5/1961 |

(Continued)

OTHER PUBLICATIONS

Escallon, "Petroleum and Petroleum/Coal Blends as Feedstocks in Laboratory-Scale and Pilot-Scale Cokers to Obtain Carbons of Potentially High Value", Ph.D. Thesis, Pensylvania State University, 24 pages, Dec. 2008.

(Continued)

*Primary Examiner* — Jonathan Miller
(74) *Attorney, Agent, or Firm* — Dinsmore & Shohl LLP

(57) ABSTRACT

There is provided a process for the production of anisotropic coke, the process comprising providing a purified coal product (PCP), wherein the PCP is in particulate form, and wherein at least about 90% by volume (% v) of the particles are no greater than about 100 μm in diameter; wherein the PCP has an ash content of less than about 10% m and a water content of less than around 5% m. The PCP is combined with a feedstock oil, such as a decant oil, in order to create a combined solid-liquid blend, wherein the solid-liquid blend comprises at least around 0.1% m and at most around 50%

(Continued)

m PCP. The solid-liquid blend is subjected to a temperature in excess of 400° C., typically as part of a delayed coker process, for a time period sufficient to induce formation of mesophase, and production of anisotropic coke. Improved yields of valuable needle coke can be obtained via the processes described.

18 Claims, 5 Drawing Sheets

(56) References Cited

U.S. PATENT DOCUMENTS

| | | | | |
|---|---|---|---|---|
| 4,259,178 | A * | 3/1981 | Wynne, Jr. | C10B 55/02 208/434 |
| 4,427,532 | A * | 1/1984 | Varghese | C10G 69/06 208/131 |
| 4,737,261 | A * | 4/1988 | Hoover | C10B 55/00 208/50 |
| 5,174,891 | A * | 12/1992 | Becraft | C10B 55/02 208/50 |
| 9,777,235 | B2 * | 10/2017 | Snaith | C10L 1/322 |
| 11,987,760 | B2 * | 5/2024 | Unsworth | C10B 53/04 |
| 2008/0256852 | A1 * | 10/2008 | Schobert | C10G 45/00 44/620 |
| 2015/0361370 | A1 * | 12/2015 | Van Thorre | C10L 5/447 44/589 |
| 2017/0096340 | A1 * | 4/2017 | Wada | C04B 35/532 |
| 2018/0258350 | A1 * | 9/2018 | Snaith | C10L 5/04 |
| 2019/0031961 | A1 * | 1/2019 | Öttinger | H05B 7/085 |
| 2019/0119119 | A1 * | 4/2019 | Chen | C01B 32/336 |
| 2021/0332303 | A1 * | 10/2021 | Groves | C10L 5/04 |

FOREIGN PATENT DOCUMENTS

| | | |
|---|---|---|
| WO | 2008005125 A1 | 1/2008 |
| WO | 2020065341 A1 | 4/2020 |
| WO | 2020227613 A1 | 11/2020 |

OTHER PUBLICATIONS

Tanabe et al., "Hydrotreating of FCC decant oil as a needle coke feedstock", Inst. Energy, 75(834), pp. 916-924, 1997.

Wang, "Molecular Composition of Needle Coke Feedstocks and Mesophase Development During Carbonization", Ph.D. Thesis, Pensylvania State University, 299 pages, Dec. 2005.

International Search Report and Written Opinion pertaining to Application No. PCT/US2021/049753 dated Nov. 25, 2021, 15 pages.

Gabdulkhakov et al., "Technology of Petroleum Needle Coke Production in Processing of Decantoil with the Use of Polystyrene as a Polymeric Mesogen Additive", ACS Omega, vol. 6, pp. 19995-20005, 2021.

Gryglewicz et al., "Sulfur Groups in the Cokes Obtained from Coals of Different Ranks", Fuel Processing Technology, vol. 19, pp. 51-59, 1988.

Guo et al., "Sulfur distribution in coke and sulfur removal during pyrolysis", Fuel Processing Technology, vol. 88, pp. 935-941, 2007.

* cited by examiner (a)

(b)

METHODS FOR THE PRODUCTION OF INCREASED ANISOTROPIC COKE

CROSS REFERENCE TO RELATED APPLICATIONS

This application claims priority to U.S. Provisional Application No. 63/077,002, filed Sep. 11, 2020, which is incorporated herein by reference in its entirety.

FIELD OF THE INVENTION

The invention is in the field of the production of coke, typically petroleum coke (pet coke) from a delayed coker process and apparatus.

BACKGROUND OF THE INVENTION

Coke produced in a delayed coker process can typically be of three main types: shot coke, sponge coke and needle coke. Shot coke is typically used for fuel and requires high concentrations of asphaltenes in the feedstock as well as turbulence in the coke drum during formation. Sponge coke is named after its sponge like appearance and tends to be produced from vacuum reduced crude (VRC). Some sponge coke, when calcined, shows utility in the production of carbon anodes for aluminium production. Needle coke is the premier coke and is used in the production of electrodes, especially steel-making electrodes which operate at much higher temperatures than those for aluminium anodes. As such needle coke commands the highest commercial value.

Needle coke is a high technology-intensive product and is primarily used in the production of graphite electrodes. Its key differentiating property is a low coefficient of thermal expansion due to oriented domain structures which can be visualised as "streamers" under polarized light. The presence of more oriented domains infers a lower coefficient of thermal expansion. The demand for lithium-ion batteries, mainly driven by the growing popularity of hybrid electric vehicles (HEV), battery electric vehicles (BEV), laptops, and smart devices, as well as growth of the steel industries (requiring graphite electrodes for arc furnaces) has led to expectations that the global market for needle coke will reach more than six billion US dollars by 2030.

Needle coke is traditionally made from decanted oil, also called slurry oil. This is obtained from the bottom of an FCC (fluid catalytic cracker) distillation column. It is a very aromatic oil with low asphaltene content, with a specific gravity greater than 1. In a needle coker, the oil is reacted under high pressure to first produce a liquid crystal-like product referred to as "mesophase". Mesophase is an anisotropic phase, intermediate between the isotropic pitch and anisotropic semi-coke, generated during the pyrolysis of some organic materials. Mesophase is composed of macromolecules of different molecular size, bonded by Van der Waals forces in a parallel stacking. The anisotropic liquid-crystal mesophase is formed from two associated mesogens (individual molecular building blocks of the mesophase derived from polycyclic organic compounds). Collision of mesogen molecules during pyrolysis results in the formation of liquid crystals (mesophase) by a process of homogenous self-assembly. Mesophase leads to formation of anisotropic coke, and when oriented (i.e. stretched or pulled) and further reacted, forms the needle-like structures that are a key characteristic of needle coke.

High quality needle coke is formed of a dense mass with a structure of carbon threads or needles oriented in a single direction (flow direction). This coke is highly crystalline, and it is these properties that are needed for manufacturing graphite electrodes. Many cokes lie between highly needle-like cokes and cokes with isotropic character. Most cokes are between these two extremes; hence, cokes might have a variety of applications as determined by their microstructures. Even though structure is not the only decisive factor to determine a given coke's use, it should be the initial criterion for the selection of a particular coke for a given application. Even premium grades of needle coke are not completely anisotropic. Needle coke can also be made from coal tar distillates. Both petroleum-based and coal-based needle cokes have excellent physical properties, such as low co-efficient of thermal expansion and low electric resistance, along with less spalling and less breakage.

New International Maritime Organization (IMO) 2020 regulations that came into effect from 1 Jan. 2020 are likely to have a considerable impact on needle coke prices and supplies. These regulations require marine vessels to decrease their emissions similar to the consumption of marine fuels with a maximum sulfur content of 0.5%, well below the sulfur content levels of 3.5% permitted until 2019. According to the new IMO rules, the price of low-sulfur crude oil usually relied upon for producing needle coke is anticipated to rise over time as a major portion of it will be consumed as marine fuel. Needle coke manufacturers, therefore, face the increased competition for feedstock thereby exerting additional pressure on the consumers of the product.

Chinese Patent Application No. 109504416 relates to production technologies of coal-based needle coke using coal oil mixtures. The document describes coal-based needle coke having a D50 between 20-50 mm.

United Kingdom Patent No. 866,859 relates to a process for the production of petroleum coke suitable for conversion into graphite for nuclear reactors and involves treating a hydrocarbon material consisting of a petroleum distillate by physical treatment and/or chemical reaction with oxygen at a temperature in the range 175 to 400° C. (347 to 752° F.) and subjecting the resultant product to a thermal cracking treatment under such conditions that petroleum coke is formed.

US Patent WO2008005125A1 describes a method of producing low CTE graphite electrodes from needle coke formed from a coal tar distillate material having a relatively high initial boiling point.

U.S. Pat. No. 4,737,261A describes a process for the production of premium grade needle coke from a hydrotreated Solvent Refined Coal.

Escallón, Maria., Petroleum and petroleum/coal blends as feedstocks in laboratory-scale and pilot-scale cokers to obtain carbons of potentially high value, Ph.D. thesis, Pennsylvania State University, December 2008. (https://etda.libraries.psu.edu/files/final_submissions/4243) describes attempts to produce needle coke from blends of decant oil and coarse coal particles ground just to below 150 microns size.

Wang, G., Molecular composition of needle coke feedstocks and mesophase development during carbonization. Ph.D. thesis, Pennsylvania State University, December 2005 (https://etda.libraries.psu.edu/files/final_submissions/2129) describes the molecular composition of decant oil and its derivatives that are used as feedstocks to produce needle coke.

Hence, in order to meet growing demand for a material that is integral to the growth of renewable and energy storage technologies, there exists a need to provide alternative sources and feedstocks for the production of high-quality needle coke.

The present invention addresses the problems that exist in the prior art, by providing process for the production of high quality mesophase, anisotropic and needle coke

SUMMARY OF THE INVENTION

The invention relates to a process for the production of mesophase and, subsequently, anisotropic and needle coke that comprises the addition of a Purified Coal Product (PCP, a form of microtine coal) to liquid coker feed-stock, such as a decanted or slurry oil, prior to thermal pre-treatment in a delayed coker.

The present inventors have developed a process that provides for the utilisation of very high quality (low ash, sulfur and water content) PCP, that has been upgraded from waste from coal tailings ponds, impoundments or tips and reject materials from current coal production processing (e.g. thickener underflow or tailings underflow waste streams), as well as high-ash content inferior seam coal, hitherto not exploitable economically. Use of the PCP as a blend component in the production of high value needle coke represents a significant step forward in the reduction of mining waste as well as meeting the increased demand for materials that support the development of renewable power technologies.

According to a first aspect of the present invention there is provided a process for the production of anisotropic coke, the process comprising the steps of:
(i) providing a purified coal product (PCP), wherein the PCP is in particulate form, and wherein at least about 90% by volume (% v) of the particles are no greater than about 100 µm in diameter; wherein the PCP has an ash content of less than about 10% m and a water content of less than around 5% m;
(ii) combining the PCP with a feedstock oil in order to create a combined solid-liquid blend, wherein the solid-liquid blend comprises at least around 0.1% m and at most around 50% m PCP;
(iii) subjecting the solid-liquid blend to a temperature in excess of 400° C. for a time period sufficient to induce formation of mesophase, and
(iv) producing anisotropic coke from the product of step (iii).

A second aspect of the invention provides a needle coke product obtainable by the process as described herein. As such, anisotropic coke produced according to the methods of the present invention may be further processed, as well as calcined, and used for the production of needle coke.

A third aspect provides a carbon electrode comprised of the needle coke as described herein.

A fourth aspect of the invention provides a process for operating a delayed coker comprising:
(i) providing a purified coal product (PCP), wherein the PCP is in particulate form, and wherein at least about 90% by volume (% v) of the particles are no greater than about 100 µm in diameter; wherein the PCP has an ash content of less than about 5% m and a water content of less than around 5% m;
(ii) combining the PCP with a feedstock oil in order to create a combined solid-liquid blend, wherein the solid-liquid blend comprises at least around 0.1% m and at most around 50% m PCP;
(iii) introducing the combined solid liquid blend to the delayed coker and subjecting the solid-liquid blend to a temperature in excess of 400° C. for a time period sufficient to induce formation of mesophase, and
(iv) producing anisotropic coke from the product of step (iii) within the delayed coker.

A sixth aspect of the invention provides for the use of a purified coal product (PCP), wherein the PCP is in particulate form, and wherein at least about 90% by volume (% v) of the particles are no greater than about 75 µm in diameter; wherein the PCP has an ash content of less than about 10% m and a water content of less than around 5% m, as an additive in a delayed coker process in order to increase the proportion of anisotropic coke produced by the process.

A seventh aspect provides a method for increasing the yield of needle coke produced by a delayed coker process comprising adding to a feedstock of decanted oil or a coal derived oil, not less than 0.1% m and not more than around 50% m of a PCP,
wherein the PCP is provided in solid particulate form, and wherein at least about 90% by volume (% v) of the particles are no greater than about 75 µm in diameter; wherein the PCP has an ash content of less than about 10% m and a sulfur content of less than around 3% m.

An eighth aspect of the invention provides a method for increasing the yield of needle coke produced by a delayed coker process comprising adding to a feedstock of decanted oil or a coal derived oil, not less than 0.1% m and not more than around 50% m of a PCP,
wherein the PCP is provided as a coal particle-in-oil slurry, and wherein at least about 90% by volume (% v) of the particles are no greater than about 75 µm in diameter; wherein the PCP has an ash content of less than about 10% m and a sulfur content of less than around 3% m.

In a ninth aspect the invention provides a mesophase promoting additive for use in a method of operating a delayed coker process, the additive comprising a purified coal product (PCP), wherein the PCP is in particulate form, and wherein at least about 90% by volume (% v) of the particles are no greater than about 100 µm in diameter; wherein the PCP has an ash content of less than about 10% m and a water content of less than around 5% m.

It will be appreciated that the invention may be subjected to further combinations of the features disclosed herein but which are not explicitly recited above.

DRAWINGS

The invention is further illustrated by reference to the accompanying drawings in which.

Figure 5:
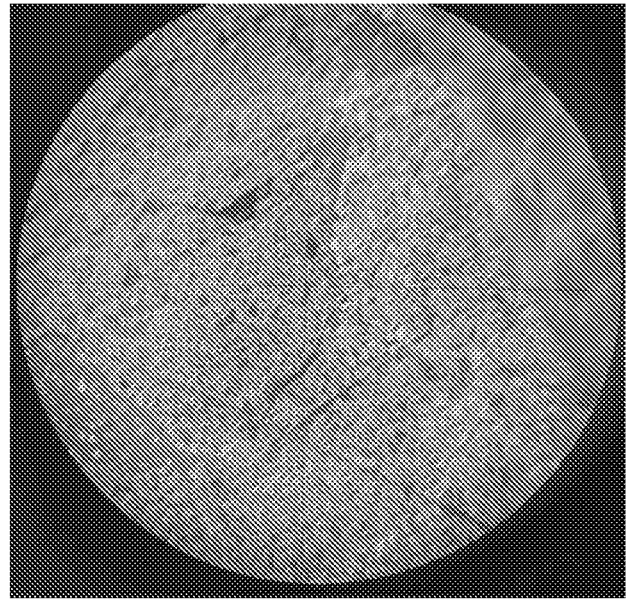
Figure 5:
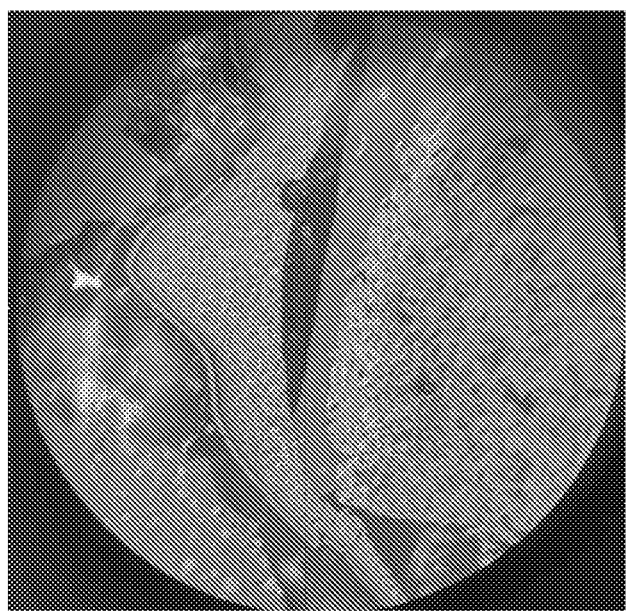
Figure 6:
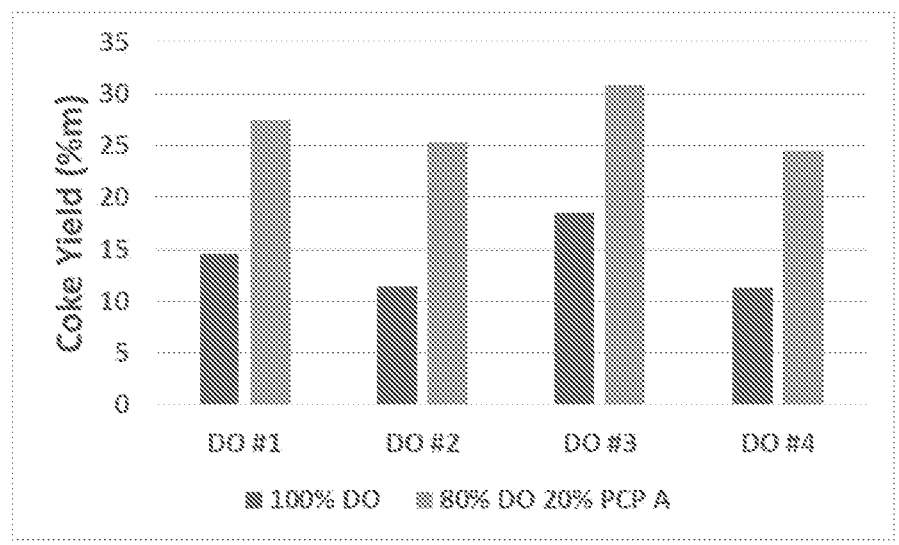
Figure 7:
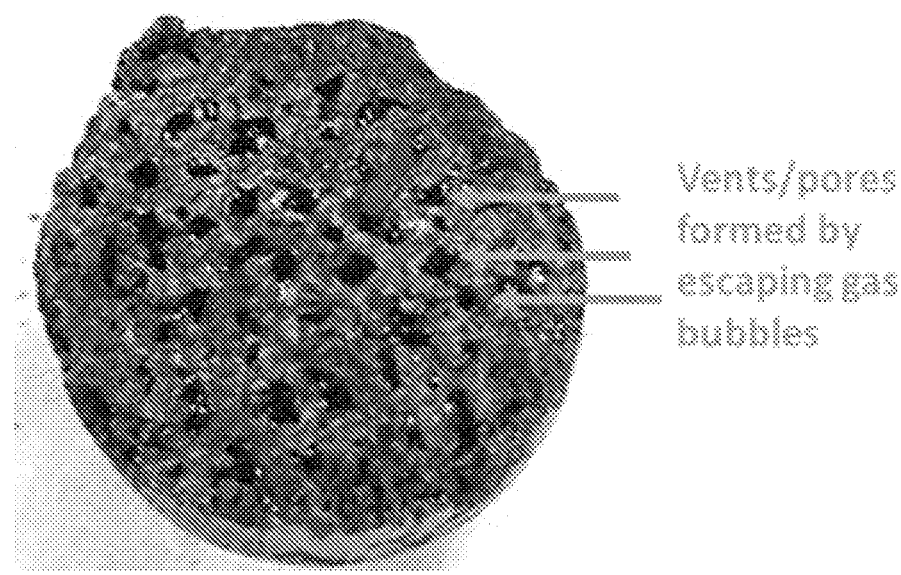
Figure 8:
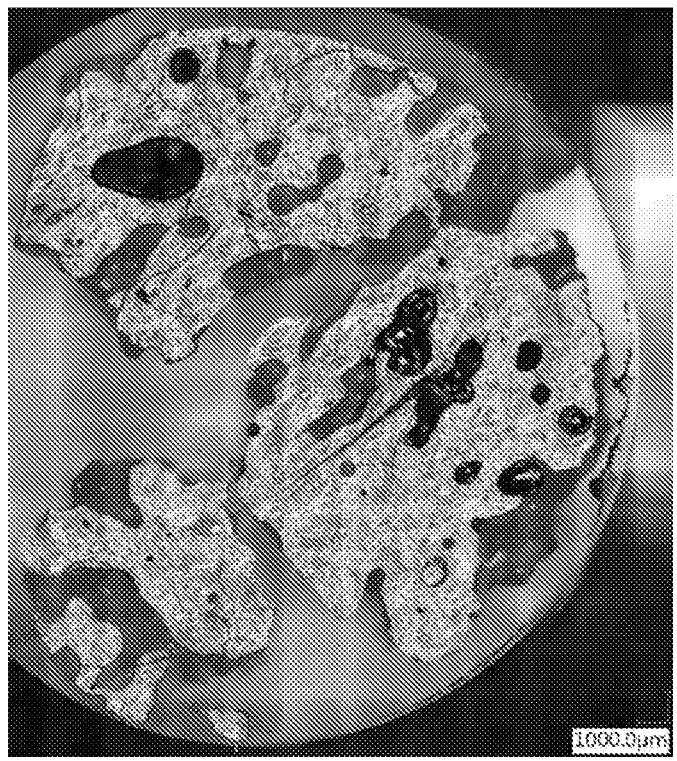
Figure 9:
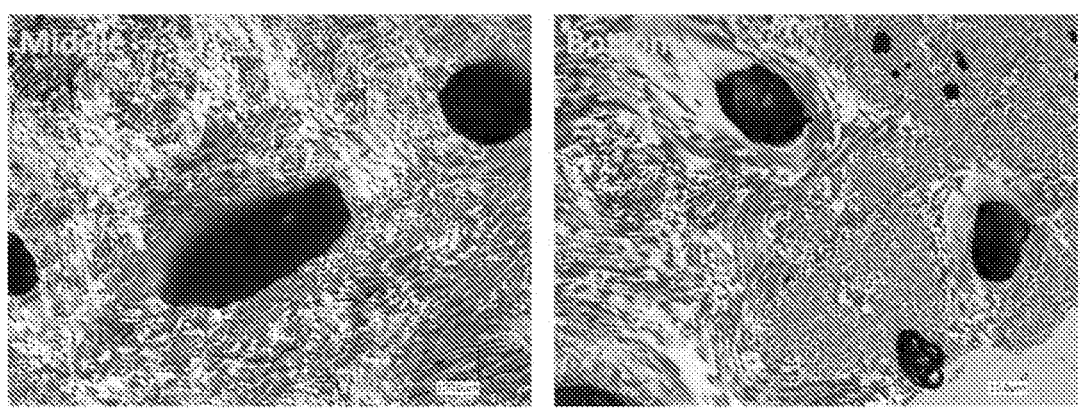

FIGS. 5 (a) and (b) are photomicrographs under polarized light of a coke sample of an embodiment of the invention prepared at 430° C. from a blend of 20% PCP B and 80% DO #1 showing approximately 46% anisotropic coke;

FIG. 6 shows a graph in which Coke Yields for 100% DO and 80% DO/20% PCP A blends are compared;

FIG. 7 shows a photograph showing macrostructure of coke formed from the reactor according to an embodiment of the invention;

FIG. 8 shows a cross-polarized light optical microscopy image of a decant oil (DO #4) coked for 6 hrs;

FIG. 9 shows cross-polarized light optical microscopy images of coke DO #4 coked for 6 hrs with PCP B according to an embodiment of the invention.

DETAILED DESCRIPTION OF THE INVENTION

All references cited herein are incorporated by reference in their entirety. Unless otherwise defined, all technical and scientific terms used herein have the same meaning as commonly understood by one of ordinary skill in the art to which this invention belongs.

Prior to setting forth the invention in greater detail, a number of definitions are provided that will assist in the understanding of the invention.

As used herein, the term "comprising" means any of the recited elements are necessarily included and other elements may optionally be included as well. "Consisting essentially of" means any recited elements are necessarily included, elements that would materially affect the basic and novel characteristics of the listed elements are excluded, and other elements may optionally be included. "Consisting of" means that all elements other than those listed are excluded. Embodiments defined by each of these terms are within the scope of this invention.

The term "coal" is used herein to denote readily combustible sedimentary mineral-derived solid hydrocarbonaceous material including, but not limited to, hard coal, such as anthracite; bituminous coal; sub-bituminous coal; and brown coal including lignite (as defined in ISO 11760:2005). "Native" or "feedstock" coal refers coal that has not been subjected to extensive processing and comprises a physical composition (e.g. maceral content) that is substantially unchanged from the point of extraction. In contrast, the terms "Purified Coal Product (PCP)", "coal-derived product", "coal replacement product" and "purified coal compositions" are used herein to refer to various coals which have been subjected to one or more processes that lead to a change in physical and/or chemical compositions of the coal such that it is substantially changed from the point of extraction—i.e. the natural state.

As used herein, the term "ash" refers to the inorganic—e.g. non-hydrocarbon—mineral component found within most types of fossil fuel, especially that found in coal. Ash is comprised within the solid residue that remains following combustion of coal, sometimes referred to as fly ash. As the source and type of coal is highly variable, so is the composition and chemistry of the ash. However, typical ash content includes several oxides, such as silicon dioxide, calcium oxide, iron (III) oxide and aluminium oxide. Depending on its source, coal may further include in trace amounts one or more substances that may be comprised within the subsequent ash, such as arsenic, beryllium, boron, cadmium, chromium, cobalt, lead, manganese, mercury, molybdenum, selenium, strontium, thallium, and vanadium.

As used herein the term "low ash coal" refers to native coal that has a proportion of ash-forming components that is lower when compared to other industry standard coals. Typically, a low ash native or feedstock coal will comprise no more than around 12% m ash. The term "deashed coal", or the related term "demineralised coal", is used herein to refer to coal that has a reduced proportion of inorganic minerals compared to its natural native state. Ash content may be determined by proximate analysis of a coal composition as described in ASTM D3174-12 Standard Test Method for Ash in the Analysis Sample of Coal and Coke from Coal. Very low ash coals, which are rare and correspondingly expensive, typically have an ash content of less than 8% m of ash.

As used herein, the term "coal fines" refers to coal in particulate form with a maximum particle size typically less than 1.0 mm. The term "coal ultrafines" or "ultrafine coal" or "ultrafines" refers to coal with a maximum particle size typically less than 0.5 mm (500 microns ($\mu$m), approximately 0.02 inches). The term "coal microfines" or "microtine coal" or "microfines" refers to coal with a maximum particle size typically less than 20 $\mu$m.

As used herein, the term "water content" refers to the total amount of water within a sample and is expressed as a concentration or as a mass percentage (% m). When the term refers to the water content in a coal sample it includes the inherent or residual water content of the coal, and any water or moisture that has been absorbed from the environment. As used herein the term "dewatered coal" refers to coal that has an absolute proportion of water that is lower than that of its natural state. The term "dewatered coal" may also be used to refer to coal that has a low naturally-occurring proportion of water. Water content may be determined by analysis of a native or purified coal composition as described in ASTM D3302/D3302M-17 Standard Test Method for Total Moisture in Coal. Coal considered as dewatered typically comprises no more than 10% m of water, typically no more than 5% m of water, and optionally less than 2% m of water.

The term "hydrocarbonaceous material" as used herein refers to a material containing hydrocarbons; hydrocarbons being an organic compound consisting substantially of the elements hydrogen and carbon. Hydrocarbonaceous material may comprise aliphatic as well as aromatic hydrocarbons. Hydrocarbonaceous materials of mineral origin may further comprise one or more heteroatoms, such as nitrogen, oxygen, or sulfur.

Recent developments processing of coal fines have made available a microfine purified coal product, PCP, that has a low water content (<15% m, typically <7% m, suitably <3% m) and a low ash content (<10% m, typically <5% m, suitably <2% m, or even <1% m). The process of demineralisation of PCP also has a beneficial effect on sulfur content via removal of iron pyrites. Demineralising and dewatering of coal fines is typically achieved via a combination of froth flotation separation, specifically designed for ultrafines and microfine particles, plus mechanical and thermal dewatering techniques. A typical process for the production of de-watered coal ultrafines is provided in WO-A-2020/065341. It will be appreciated, however, that several other suitable dewatering processes also exist within the art, for example, providing coal as cake comprising coal fine particles in a hydrocarbon carrier with water having been removed through the use of one or more hydrophilic solvents.

Any particle size of coal fines that is suitable for distillation with residue oil is considered to be encompassed by the invention. Suitably, the particle size of the coal fines is in the ultrafine range. Most suitably the particle size of the coal fines is in the microfine range. Specifically, the maximum average particle size may be at most 500 $\mu$m. More suitably, the maximum average particle size may be at most 300 µm, 250 µm, 200 µm, 150 µm, or 100 µm. Most suitably, the maximum average particle size may be at most 75 µm, 50 µm, 40 µm, 30 µm, 20 µm, 10 µm, or 5 µm. The minimum average particle size may be 0.01 µm, 0.1 µm, 0.5 µm, 1 µm, 2 µm, or 5 µm. Hence, in particular embodiments the invention includes utilisation of nanoscale coal fines with average particle sizes in the sub-micron range.

An alternative measure of particle size is to quote a maximum particle size and a percentage value or "d" value for the proportion by volume of particles within the sample that fall below that particle size. For the present invention any particle size of coal fines that is suitable for distillation with crude oil is considered to be encompassed by the invention. Suitably, the particle size of the coal fines is in the ultrafine range. Most suitably the particle size of the coal fines is in the microfine range. Specifically, the maximum particle size may be at most 500 µm. More suitably, the maximum particle size may be at most 300 µm, 250 µm, 200 µm, 150 µm, or 100 µm. Most suitably, the maximum particle size may be at most 75 µm, 50 µm, 40 µm, 30 µm, 20 µm, 10 µm, or 5 µm. The minimum particle size may be 0.01 µm, 0.1 µm, 0.5 µm, 1 µm, 2.0 µm, or 5 µm. Any "d" value may be associated with any one of these particle sizes. Suitably, the "d" value associated with any of the above maximum particle sizes may be d99, d98, d95, d90, d80, d70, d60, or d50. To maximize the reaction of coal in a delayed coker process, it is desirable for the coal particle size to be both relatively homogeneous and small, in order to enable the small particles to be well-dispersed in the residue oil phase. For instance, in a specific embodiment of the invention the microfine coal has a d90 of <100 µm, <90 µm, <70 µm, <50 µm optionally <20 µm. Suitably, the microfine coal has a d99 of <70 µm, <60 µm, <50 µm, <40 µm optionally <20 µm.

According to a specific embodiment of the invention a process is provided that blends (i.e. suspends) the solid particulate matter of de-watered, demineralised microfine coal, suitably in a feedstock oil having high aromatic content. The amount of microfine coal that may be blended with the feedstock oil (e.g. decant oil) is at least 1% m (one mass percent), suitably at least 5% m, typically around up to 20% m, optionally around up to 30% and at most 70% m, suitably at most 60% m, optionally at most 50% m. Hence, the microfine coal component may comprise a majority, by mass, of the resultant blended feedstock. This allows for considerable economies of production, by replacing a significant proportion of liquid component with cheaper solid material. The combined blend may also be introduced into existing apparatus and processes without extensive re-design of conventional equipment.

As previously described, the present invention provides, in specific embodiments, for the blending or mixing of de-watered, demineralised microfine coal, within a feedstock oil having high aromatic content. Typically, the feedstock oil will be selected from aromatic decant oils low in asphaltenes, ethylene cracker bottoms, and oils derived from coal tar liquids.

In a conventional delayed needle coking process, a heavy aromatic oil (e.g. decant oil) is heated to its cracking temperature of in excess of 450° C. (suitably around 480° C.) in the presence of steam in a furnace and then routed to one or more coke drums. Without wishing to be bound by theory, it is believed that thermal cracking already begins in the feed pipe between the furnace and the one or more coke drums and finishes in the drum. The addition of steams assists in preventing deposition of coke in the feed pipe. Further thermal cracking occurs inside the drum where coke is formed with a mesophase crystalline structure. Any distillates and gas produced are sent to a fractionator or to another refinery process. Typically, the coker apparatus will comprise at least a first and a second coke drums, such that whilst the first drum is filling with coke the second drum is steamed to further reduce the hydrocarbon content of the coke and then quenched with water for cooling. After the first drum has filled, the process is switched to the second drum so that the hot mixture from the furnace reaches the second drum to allow for a batch continuous production process. A high-pressure decoking derrick may be positioned above the one or more coke drums and may be used to deliver high pressure water to the coker drum in order to facilitate removal of the so called 'green' coke which is usually collected from the bottom of the drum. The green coke may be further subjected to a calcination step at a temperature in excess of 1000° C. in an inert atmosphere (e.g. in a rotary calciner) in order to produce final electrode grade needle coke.

Typically needle coke is low in sulfur (<0.6% m) and nitrogen, and also exhibits a maximum amount of coarse sizing (>6 mm), low metal contamination (<500 ppm Ni and V), a minimum amount of fines (<1 mm), good density (>78 grams/100 cm$^3$; 4/6 mesh test), low ash content (<0.3%), and a high real density (2.13 grams/cm$^3$). A further measure of needle coke quality is the linear coefficient of thermal expansion, or CTE. To be designated a premium coke, it is generally considered that a CTE of less than about $1.0 \times 10^{-6}$/° C. (measured in the temperature range of 100 to 400° C.) is enough to designate the product as meeting the premium coke benchmark.

Optimisation of needle coke formation within a delayed coker requires control of multiple parameters, including temperature and pressure, that promote mesophase formation and uniaxial rearrangement. Mesophase is typically produced from the condensation reaction of highly aromatic molecules. These multi-ring structures lose aliphatic side chains by thermal cracking, form stabilized free radicals, and then combine with other molecules to form a liquid crystal structure. This liquid crystal structure is then stretched in one direction by the upward flowing of steam and cracked products to produce the anisotropic structure typical of needle coke.

Mesophase can be produced from oils derived from petroleum, coal, or a combination of these. While not wishing to be bound by theory, it is believed that when PCP is combined with an oil and subjected to delayed coking conditions, highly aromatic molecules that would have reported to the coal tar product stream in a metallurgical coker are expressed from the PCP; these highly aromatic molecules react with the other aromatic molecules in the oil phase, undergoing the same type of thermal cracking of side chains and re-combination to form even larger aromatic structures that eventually form mesophase. This increases the coke yield relative to that achieved with oil alone.

Furthermore, it has been observed that PCP tends to absorb oil molecules, hindering them from vaporizing. This retardation of vaporization creates greater residence time in the coke drum, especially for the lighter aromatic molecules. This allows more time for thermal cracking of side chains and recombination of aromatic cores into molecules that are too large to vaporize under delayed coking conditions, This further increases the yield of needle coke.

In addition, in specific embodiments, using a microtine coal (d90<50 microns) PCP with very low ash content (<1% m) and low sulfur (<1% m) enables the resultant needle coke to meet specifications for higher premium value product, even when using oil feedstocks whose quality is considered inadequate for needle coke manufacture.

In embodiments of the invention, the coke prepared according to the described methods may be subjected to one or more additional calcination steps in order to produce a calcined coke product. Calcined coke is used in a variety of industries and applications; in particular it is a valuable material for the production of carbon anodes and electrodes, for use in the manufacture of lithium batteries and in steel smelting. Coke produced by the methods described, may be calcined in rotary kilns, where the coke is heated to temperatures between 1100 and 1350° C. (2192 to 2460° F.). The elevated heat treatment removes any excess moisture, extracts all remaining hydrocarbons and modifies the crystalline structure of the coke, resulting in a dense electrically conductive product.

The invention is further illustrated by the following non-limiting examples.

EXAMPLE 1

Tests were conducted in a micro-coker apparatus using decanted oils, Table 1, from four different U.S. refineries, and blends of these decanted oils (DO) with PCP under various temperatures and reaction times. The experimental data show that essentially complete reaction and a reasonable coke yield can be achieved at a temperature of 500° C. and 60 minutes. Note that unlike a commercial coker, the micro-coker is not pressurized. This allows the lighter cracked products to escape the apparatus: this limits the yield of coke.

TABLE 1

Properties of the four decant oils tested

| Decant Oil # | | 1 | 2 | 3 | 4 |
|---|---|---|---|---|---|
| API | | 15.9 | 5.3 | −0.4 | −1.1 |
| Simulated distillation (SIMDIS) (° C.) | | | | | |
| 5% | % m | 318 | 301 | 307 | 314 |
| 20% | | 397 | 346 | 372 | 357 |
| 40% | | 432 | 378 | 403 | 384 |
| 60% | | 463 | 407 | 431 | 413 |
| 80% | | 508 | 441 | 469 | 460 |
| 90% | | 552 | 468 | 504 | 544 |
| MicroCarbon Residue | % m | 7 | 4 | 8 | 6 |
| Ash content | | 0.02 | <0.01 | 0.02 | 0.003 |
| Carbon content | | 88.6 | not available | | 91.9 |
| Hydrogen content | | 9.9 | | | 8.0 |
| Nitrogen content | | 0.25 | | | 0.04 |
| Sulphur content | | 1.00 | 0.97 | 1.22 | 0.09 |

PCP was prepared according to U.S. Pat. No. 9,777,235 from two US high volatile bituminous coals, A and B, Table 2.

TABLE 2

Properties of PCPs tested

| | Elemental composition | | | | | Volatile Matter content | Ash content |
|---|---|---|---|---|---|---|---|
| PCP | C | H | N | O | S | | % m, dry basis |
| | % mass, dry ash-free | | | | | | |
| A | 83.42 | 5.05 | 1.55 | 9.10 | 0.87 | 33 | 1.0 |
| B | 78.15 | 5.42 | 1.48 | 12.65 | 2.30 | 41 | 1.4 |

Each experiment consisted of four crucibles, with each crucible containing about a gram of feedstock. The yield of coke and volatiles was calculated for each crucible and then averaged for the set. Comparative runs were made with decanted oil alone, and with blends of PCP in decanted oil. The coke made from a number of these runs was then weighed and combined to make a sufficiently large enough sample for analysis. Samples of coke were mounted in polymer and polished to obtain a flat surface. The samples were then microscopically analyzed under polarized light to determine areas of "isotropic coke" and areas of "anisotropic coke".

Figure 1:
FIG. 1 is a photomicrograph of a coke sample under polarized light showing "Solid" coloration of isotropic coke, with no evidence of liquid crystal formation.
Figure 2:
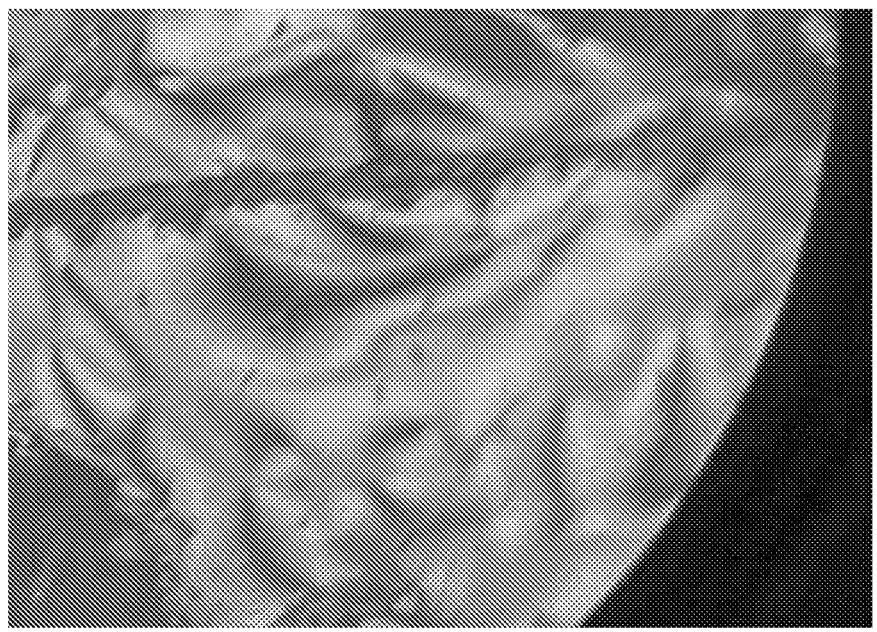
FIG. 2 is a photomicrograph of a coke sample under polarized light showing "Rainbow" coloration of coke from mesophase. Light refraction is due to formation of liquid crystals prior to solidification.

Isotropic coke is "the same in all directions" and is typical of common fuel or anode grade coke made from vacuum residue (e.g. sponge coke or anode coke). Under polarized light, it appears as a single color as shown in FIG. 1. By contrast, anisotropic coke shows differences in physical properties in one direction versus the other. One of those differences is the ability to refract light, leading to a visible "rainbow" pattern under polarized light as shown in photomicrograph of FIG. 2. This property is due to the liquid crystal mesophase precursor from which it is made. The presence of mesophase during coking indicates that even under poorly favorable non-pressurized conditions there is a tendency to produce needle coke from the combination feedstock of decant oil and PCP. Hence, if oriented during a pressurized commercial coking process it is highly likely that the mesophase would result in the formation of improved yields of high value needle coke.

Image analysis software can sum up the areas of constant color (isotropic coke) and the areas showing a rainbow pattern (anisotropic coke), thereby enabling the calculation of the relative amount of each species. The areas showing refraction can be further sub-divided into various categories of mesophase such a fine, coarse, circular, and incipient.

A range of micro-coker tests were carried out to determine the effect of temperature and concentration for the two types of PCP and four decant oils on the proportion of anisotropic coke formed, see Table 3.

Figure 3:
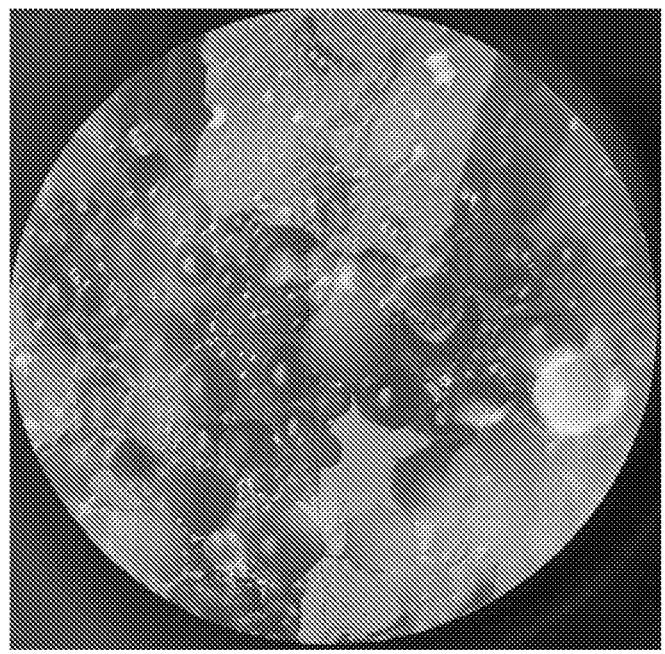
FIG. 3 is a photomicrograph under polarized light of a coke sample from decant oil (DO) #1 alone prepared at 430° C. showing mostly isotropic coke with about 20% anisotropic coke.
Figure 4:
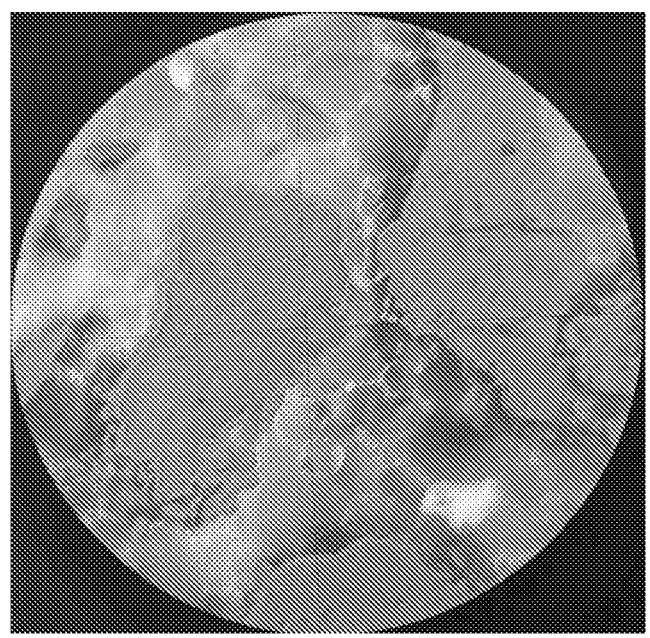
FIG. 4 is a photomicrograph under polarized light of a coke sample from micronized purified coal product (PCP) B alone (Test 15) prepared at 430° C. showing virtually all isotropic coke and almost no mesophase.

The results show that decanted oil #1 alone at 430° C. (Test 9) produced a coke that was 80% isotropic and 20% anisotropic. This is a relatively low percentage of needle coke precursor. A micrograph of this coke under polarized light is shown in FIG. 3. Coke produced from PCP alone at 430° C., analyzed by the same procedures yielded a coke that was 94% (PCP A, Test 12) to 97% (PCP B, Test 15) isotropic, with only traces of various forms of mesophase. A micrograph of this coke from PCP B under polarized light is shown in FIG. 4.

The coke produced from a blend of 20% Ohio coal derived PCP B and 80% DO #1 at 430° C. showed an unexpectedly significant increase in the anisotropic content from 20% for DO #1 alone to 46% for the PCP B/DO #1 blend (Test 13) even under unpressurized conditions. This indicates that this blend may be a significantly better feedstock for needle coke production than the decant oil alone. The individual anisotropic regions from the blend were smaller and more scattered than those seen in the coke from decanted oil coke alone, but the overall quantity of anisotropic regions was more than double that seen from decanted oil alone. These results can be seen in FIG. 5.

The results are surprising, since coke made from PCP B, and analyzed by the same procedures, yielded a coke that was 98% isotropic, with only traces of various forms of mesophase. It appears that the blend resulted in a unexpectedly synergistic combination that led to much more liquid crystal (mesophase) formation during coking than for either feedstock alone.

It should be further noted that DO #1 alone only produced about 8% coke at these conditions, while the PCP B/DO #1 blend produced 18% coke. Hence, the PCP/DO blend produced both a higher yield of anisotropic coke as well as a higher proportion of anisotropic coke in the solid product.

TABLE 3

A range of tests were carried out to determine the effect of temperature and concentration for the two types of PCP and four decant oils.

| Test No. | Decant oil | Concentration of Decant Oil % m | PCP | Concentration of PCP % m | Coke preparation temperature °C. | Proportion of anisotropic coke % by volume |
|---|---|---|---|---|---|---|
| 1 | #1 | 100 | none | 0 | 450 | 86.4 |
| 2 | none | 0 | A | 100 | 450 | 6.0 |
| 3 | #1 | 80 | A | 20 | 450 | 96.8 |
| 4 | #1 | 60 | A | 40 | 450 | 98.0 |
| 5 | #4 | 100 | none | 0 | 450 | 80.0 |
| 6 | #4 | 80 | A | 20 | 450 | 97.1 |
| 7 | #4 | 80 | B | 20 | 450 | 99.6 |
| 8 | none | 0 | B | 100 | 450 | 2.4 |
| 9 | #1 | 100 | none | 0 | 430 | 20.0 |
| 10 | #4 | 100 | none | 0 | 430 | 17.6 |
| 11 | #1 | 80 | A | 20 | 430 | 66.8 |
| 12 | none | 0 | A | 100 | 430 | 6.0 |
| 13 | #1 | 80 | B | 20 | 430 | 46.0 |
| 14 | #4 | 80 | B | 20 | 430 | 64.4 |
| 15 | none | 0 | B | 100 | 430 | 3.2 |
| 16 | #4 | 100 | none | 0 | 500 | 100.0 |
| 17 | none | 0 | A | 100 | 500 | 5.2 |
| 18 | #4 | 80 | A | 20 | 500 | 99.6 |
| 19 | #1 | 60 | A | 40 | 500 | 99.2 |
| 20 | none | 0 | B | 100 | 500 | 2.8 |
| 21 | #4 | 80 | B | 20 | 500 | 96.8 |
| 22 | #2 | 100 | none | 0 | 450 | 74.4 |
| 23 | #2 | 80 | A | 20 | 450 | 86.4 |
| 24 | #3 | 100 | none | 0 | 450 | 54.4 |
| 25 | #3 | 80 | A | 20 | 450 | 88.8 |

2: from 74.4% v (Test 22) to 86.4% v (Test 23),
3: from 54.4% v (Test 24) to 88.8% v (Test 25),
4: from 80.0% v (Test 5) to 97.1% (Test 6).

Thus, PCP is interacting with decant oils not only to produce anisotropic coke from PCP itself but also to enhance the amount of anisotropic coke formed from the decant oil.

Different Decant Oils and Influence of Temperature
1. Tests 1, 5, 22 & 24 show that the pyrolysis experiment at 450° C. generates significant amounts of anisotropic coke from decant oils and discriminates between different oils. #1 and #4 decant oils produce more anisotropic coke than #2 and #3. #4 decant oil is known to be used as a feed for needle coke production and produces 100% anisotropic coke.
2. Tests 9 and 10 show that much less anisotropic coke is produced at the lower pyrolysis temperature of 430° C. from decant oils #1 and #4: 20% v and 17.6% v respectively compared with 86.4% v and 80% v respectively at 450° C. (Tests 1 and 5).
3. Test 16 shows that more anisotropic coke is produced at the higher pyrolysis temperature of 500° C. from decant oil #4: 100% v compared with 80% v at 450° C. (Test 5).

Different PCPs and Influence of Temperature
4. Tests 12, 2 and 17 (PCP A) and Tests 15, 8 and 20 (PCP B) show that very little (less than 6% v) anisotropic coke is formed from either PCP A or B when pyrolyzed on their own at 430, 450 or 500° C.

Formation of Anisotropic Coke from Different PCPs in a Range of Decant Oil Blends at 450° C.
5. 20% addition of PCP A in all four decant oils significantly increases anisotropic coke yield at 450° C. for:
   #1: from 86.4% v (Test 1) to 96.8% v (Test 3), 6. 40% addition of PCP A in #1 decant oil increases anisotropic coke yield even more than with 20% of PCP A from 96.8% v (Test 3) to 98.0% v (Test 4).
7. 20% addition of PCP B in #4 decant oil also significantly increases anisotropic coke yield at 450° C. for #4 from 80.0% v (Test 5) to 99.6% v (Test 7).

Influence of Temperature on Formation of Anisotropic Coke from PCP/Decant Oil Blends
8. At the lower temperature of 430° C., 20% addition of PCP significantly increases anisotropic coke yield for #1 decant oil from 20% v (Test 9) to 66.8% v (Test 11, PCP A), and 46.0% v (Test 13, PCP B).
   A blend of 20% PCP B with decant oil #4 gave a similar yield of 64.4% v (Test 14).
   Thus, addition of PCP speeds up the production of anisotropic coke from decant oil at the lower temperature of 430° C.
9. At the higher temperature of 500° C., #4 decant oil produces entirely anisotropic coke (Test 16). 20% blends of PCP with #4 decant oil produces almost entirely anisotropic coke: 99.6% v (Test 18, PCP A) and 96.8% v (Test 21, PCP B).
   A blend of 40% PCP A with decant oil #1 gave a similar high yield of 99.2% v (Test 19).
   Thus, little difference in anisotropic coke yields between decant oils and PCP/decant oil blends of 20% m and 40% m is observed at the higher temperature of 500° C.

Increased Yield with PCP Addition
10. FIG. 6 shows coke yields obtained at 450° C. for 100% DO and 80% DO/20% PCP for the four different decant oils.
Adding 20% PCP A to all four decant oils increases coke yield by 12-14% m, i.e. for:
1: from 14.6% m to 27.5% m
2: from 11.4% m to 25.3% m
3: from 18.5% m to 30.9% m
4: from 11.3% m to 24.5% m.
Thus, not only does PCP addition improve quality (anisotropic coke purity) it also increases anisotropic coke yield significantly. Typically, in operations, higher needle coke yield is associated with lower coke quality.

EXAMPLE 2

A Parr Autoclave reactor was modified to include a knockout trap for the collection of liquids. The knockout trap was fitted with a variable backpressure regulator capable of operating up to 100 psi. Experiments were performed after purging the system with nitrogen and pressurizing under nitrogen. A liner was installed inside the reaction cylinder to enable easy removal the coke mass. The optimum conditions required to maximise needle coke formation and minimise the amount of residual N-Methyl Pyrrolidone (NMP) soluble material and isotropic pitch were adopted: 500° C. for 6 hrs with 70 psi back pressure.

The morphology of the coke produced showed the desired channels/pores (FIG. 7) generated by the escape of gas bubbles during coking which aligns the mesophase leading to needle coke morphology. There was good alignment and structuring of the anisotropic coke around vent pores. FIG. 8 shows striated flow anisotropic formations by cross-polarized light optical microscopy. The image has been stitched to show the whole material that was analyzed by microscopy. No isotropic pitch was observed, and the sample had very low solubility in NMP indicating a high conversion to coke.

Needle Coke Reaction in the Presence of PCP B

Using 6 hrs thermal soak at 500° C. and 70 psi, the coking experiments were repeated using the DO #4 blended with 20% PCP B. For microscopy analysis, coke samples were taken from the middle and bottom and analyzed by cross-polarized light optical microscopy, FIG. 9, at higher magnification than FIG. 8. Coke from the middle sample (left image) has flow domains with longer striations and looked similar to needle coke produced from DO #4 alone. The sample from the bottom (right hand image) did show some fine anisotropic structures and also some flow domains. It appears that most of the coke has a morphology similar to needle coke.

Quantitative coke microscopy showed that more anisotropic coke (98.8% v) was obtained from this PCP B/DO #4 blend than DO #4 alone (97.2% v).

Gravimetric yields for coke, liquid and gas were measured. The 20% PCP/DO #4 blend gave:
Much higher coke yield, increased by almost 9% m to 58.6% m from 49.9% m for DO #4;
Surprisingly lower gas yield, decreased by almost 8% m to 32.4% m from 40.3% m for DO #4;
Similar liquid yields, decreased slightly (almost 1% m) to 9.0% from 9.8% m.

The increased coke yield is consistent with results obtained for the micro-coker apparatus in Example 1, shown in FIG. 6. The observed increase in coke and decrease in gas will provide a significant value to the needle coke making process.

CONCLUSIONS

Coking a blend of 80% decanted oil and 20% Ohio coal-derived PCP results in a significantly different yield and quality of anisotropic coke compared to that generated from the two species in the blend alone.

The blend produces significantly more meso-phase coke than either species alone. With proper orientation while in the liquid crystal phase, this could result in much higher yields of needle coke.

The above results were produced at zero back pressure. Production scale needle cokers are typically operated at pressures of about 90 psig. The presence of PCP in the feedstock bend may afford refiners the ability to operate needle cokers at lower pressures (lower operating costs) without sacrificing coke yield.

A commercial needle coker relies on steam, gas bubbles and a large aspect ratio (length/diameter) to stretch and orient the mesophase, The reactor used in Example 2 has no steam and a low aspect ratio, so it is all the more remarkable that oriented mesophase/needle coke has been prepared using a PCP/DO blend.

EXAMPLE 3

Achieving Analytical Quality Requirements of Needle Coke

It is generally desirable for needle coke to be low in sulfur (<0.6% m), have low metal contamination (<500 ppm Nickel and Vanadium), and a low ash content (<0.3%), Table 4 gives the data for these parameters for decant oil DO #4 and 5 PCPs of different geographical and geological origin: PCPs A-E.

The ash content and S contents of PCP depend on the source of the waste coal being purified as described earlier. PCP has been derived from coals having a wide range of different geographical and geological origins. PCP with an ash content as low as 0.26% m (Colombia Paleocene PCP E), 0.38% m (USA Cretaceous, PCP C) and 0.59% m (Australian Permian PCP D) has been achieved, as well as many in the 0.9-1.0% m ash content range (USA Carboniferous, e.g. PCP A & PCP B).

TABLE 4

Maximum PCP blend proportions which meet needle coke specifications calculated for blends of four PCPs with Decant Oil #4 (DO#4).

| Specification Parameter Analyses | Unit | Needle coke limit | Decant Oil sample DO#4 | PCP samples | | | | |
|---|---|---|---|---|---|---|---|---|
| | | | | PCP A | PCP B | PCP C | PCP D | PCP E |
| Vanadium | ppm | <500 | 3 | 20 | | Not determined | | |
| Nickel | w | <500 | 7 | 5 | | | | |
| Ash | % m | <0.3 | 0.003 | 1.0 | 1.4 | 0.38 | 0.59 | 0.26 |

TABLE 4-continued

Maximum PCP blend proportions which meet needle coke specifications calculated
for blends of four PCPs with Decant Oil #4 (DO#4).

| Specification Parameter Analyses | Unit | Needle coke limit | Decant Oil sample DO#4 | PCP samples | | | | |
|---|---|---|---|---|---|---|---|---|
| | | | | PCP A | PCP B | PCP C | PCP D | PCP E |
| Sulphur | | <0.6 | 0.09 | 0.87 | 2.3 | 0.63 | 0.55 | 0.5 |
| Fixed Carbon/Coke yield | | n/a | 11.3 | 67 | 59 | 57 | 62 | 62 |
| Calculated values | | | | | | | | |
| S in coke | % m | Not applicable (n/a) | 0.48 | 0.91 | 2.73 | 0.77 | 0.62 | 0.56 |
| PCP proportion meeting S limit | | | n/a | 28 | 5.4 | 41 | 85 | 100 |
| S in blend | | | | 0.599 | 0.599 | 0.599 | 0.600 | 0.565 |
| Ash in coke | | | 0.03 | 1.49 | 2.37 | 0.67 | 0.95 | 0.42 |
| PCP proportion meeting Ash limit | | | n/a | 18 | 11 | 42 | 29 | 69 |
| Ash in blend | | | | 0.293 | 0.288 | 0.297 | 0.297 | 0.299 |
| PCP proportion meeting both S and Ash limits | | | | 18 | 5.4 | 41 | 29 | 69 |

Calculation equations used in Table 4:

$$V \text{ in DO coke} = V_{DO} = V \text{ in DO/Coke yield} \quad (1)$$

$$Ni \text{ in DO coke} = Ni_{DO} = Ni \text{ in DO/Coke yield} \quad (2)$$

$$V \text{ in PCP coke} = V_{PCP} = V \text{ in PCP/Fixed Carbon content} \quad (3)$$

$$Ni \text{ in PCP coke} = Ni_{PCP} = Ni \text{ in PCP/Fixed Carbon content} \quad (4)$$

$$S \text{ in DO coke} = S_{DO} = \text{Sulfur condensation ratio} (Cs_{DO}) \times S \text{ in DO/Coke yield} \quad (5)$$

$$S \text{ in PCP coke} = S_{PCP} = \text{Sulfur condensation ratio} (Cs_{PCP}) \times S \text{ in PCP/Fixed Carbon content} \quad (6)$$

$$S \text{ in blend} = S_{PCP} \times B_{PCP} + S_{DO} \times (1 - B_{PCP}), \text{ where } B_{PCP} = \text{proportion of PCP in PCP/DO blend} \quad (7)$$

$$Ash \text{ in DO coke} = Ash_{DO} = Ash \text{ in DO/Coke Yield} \quad (8)$$

$$Ash \text{ in PCP coke} = Ash_{PCP} = Ash \text{ in PCP/Fixed Carbon content} \quad (9)$$

$$Ash \text{ in blend} = Ash_{PCP} \times B_{PCP} + Ash_{DO} \times (1 - B_{PCP}). \quad (10)$$

Vanadium (V) and Nickel (Ni) Contents

Table 4 gives V and Ni content of DO #4 as 3 and 7 ppm.w respectively. The coke yield from DO #4 of 11.3% m is derived from FIG. 6. Assuming a worst case that all the V and Ni present in the DO is found in the resultant coke, coke derived from DO #4 will have V content of 27 ppm,w ($V_{DO}$) and Ni content of 63 ppm,w ($Ni_{DO}$), both of which are well below the required needle coke limits for each element.

V and Ni contents of PCP A are 20 ppm,w and 5 ppm, w respectively. The fixed carbon content (100%–volatile matter content) provides an approximate value for coke yield of PCPs, in this case 67% m. V and Ni data is available only for PCP A, but these levels are typical and are, therefore, broadly indicative of waste coal sources in general. Coke derived from PCP A will have a V content of 30 ppm,w, $V_{PCP}$, see equation (3), and a Ni content of 7 ppm,w, $Ni_{PCP}$, see equation (4). Both $V_{PCP}$ and $Ni_{PCP}$ are well below the required needle coke limits for each element and commensurate (V) or much less (Ni) than that derived from DO #4.

Any blend of PCP A and DO #4 will therefore satisfy the needle coke V and Ni requirements. The decant oils used for needle coke manufacture are chosen such that V and Ni levels will meet the 500 ppm,w requirements. Similarly, sources for PCP can be chosen also to meet these requirements or less. In the latter case a DO slightly above the V/Ni limits could actually be brought within the specification by blending with an appropriate PCP. Hence, the use of PCP may serve to broaden the range of DO feedstocks available to manufacture high value needle coke.

Sulfur (S) Content

Low S content (<0.6% m) is a needle coke requirement. A substantial proportion of the S in DO does not end up in the coke. A sulfur condensation ratio ($Cs_{DO}$) which describes the percentage fraction of sulfur in the DO feed incorporated into needle coke has been derived as follows, see Tanabe et al., *Hydrotreating of FCC decant oil as a needle coke feedstock*, J. Japan Inst Energy 1997, 75 (834) pp. 916-924, (https://www.jstagejst.go.jp/article/jie1992/75/10/75_10_916/_pdf) and Cs values of 52-56% obtained. Using data in *Technology of Petroleum Needle Coke Production in Processing of Decantoil with the Use of Polystyrene as a Polymeric Mesogen Additive*, Gabdulkhakov et al., ACS Omega 2021, 6, 30, 19995-20005, https://doi.org/10.1021/acsomega.1c02985, a $Cs_{DO}$ value of 62% results.

DO #4 has a low S content of 0.09%, however it produces a low coke yield (11.3% m). Taking 60% as an average value for $Cs_{DO}$ based on the above, results in an estimated coke S content ($S_{DO}$) of 0.48% m, see equation (5), which is well below the needle coke 0.6% limit for sulfur.

PCP sulfur is almost all organic S, as pyritic and sulphate, S is removed during the preparation stages. A substantial proportion of the S in PCP does not end up in the coke. A sulfur condensation ratio ($Cs_{PCP}$) which describes the percentage fraction of PCP sulfur incorporated into needle coke has been derived in a similar way as DO. PCPs A-E are all purified waste derived from high volatile bituminous coals and $Cs_{PCP}$ values of 59-75% have been obtained for a range of coals containing predominantly organic sulfur, see Gryglewicz et al., *Sulfur groups in the Cokes Obtained from Coals of Different Rank*, Fuel Processing Technology 19 (1988) 51-59, https://doi.org/10.1016/0378-3820(88)90085-9 and Guo et al., *Sulfur distribution in coke and sulfur removal during pyrolysis*, Fuel Processing Technology 88 (2007) 935-941, and references therein, https://doi.org/10.1016/j.fuproc.2007.05.003.

Taking 70% as an average value for $Cs_{PCP}$ based on the above, PCP coke S content ($S_{PCP}$) has been estimated, see equation (6). $S_{PCP}$ ranges from lowest 0.56% m (PCP E) to highest 2.73% (PCP B).

Using equation (7) the S content of coke prepared from any proportion of PCP ($B_{PCP}$) in a blend with DO can be calculated. Equation (7) has been used to calculate the maximum value of $B_{PCP}$ for each PCP that can be blended with DO and meet the 0.6% m needle coke S specification limit. Values of maximum $B_{PCP}$ range from lowest of 5.4% m (PCP B) to unlimited (PCP E), Table 4, with the other PCPs within the range 28% m to 85% m. It is very surprising at first sight that a high sulfur PCP (e.g. PCP B) could be incorporated in a PCP/DO blend at all and meet the needle coke specifications.

Ash Content

Low ash content (<0.3% m) is a needle coke requirement. Table 1 shows that the ash content of DOs is very low varying from almost undetectable (DOs #2 and #4) to 0.02% m (DOs #1 and #3). Note however that the low coke yield (11.3% m) from DO #4 results in a coke ash content of 0.03% m, equation (8), still very low and well within the limit, yet significant.

PCP coke ash content ($Ash_{PCP}$) has been estimated based on the realistic assumption that all this ash is found in the coke, see equation (9). $Ash_{PCP}$ ranges from lowest 0.42% m (PCP E) to highest 2.37% (PCP B).

Using equation (10) the ash content of coke prepared from any proportion of PCP ($B_{PCP}$) in a blend with DO can be calculated. Equation (10) has been used to calculate the maximum value of $B_{PCP}$ for each PCP that can be blended with DO and meet the 0.3% m needle coke ash specification limit. Values ranging from lowest of 11% m (PCP B) to highest of 69% m (PCP E) are obtained, Table 4.

CONCLUSIONS

These examples demonstrate that needle coke V, Ni, S and ash specifications for needle coke can be met by a variety of PCP/DO #4 blends, one of these, PCP E, at a PCP concentration as high as 69% m (see Table 4). The controlling factor is the lower of the PCP limits for sulfur or ash. Clearly the maximum PCP blend concentration depends critically on the values for PCP ash, sulfur and fixed carbon contents, as well as those for the respective DO. Nevertheless, other considerations, such as increasing blend viscosity with increasing PCP content in a PCP/DO blend, introduce practical limitations as well. In specific embodiments of the invention, it is expected that upper value of $B_{PCP}$ is set at approximately 30% m.

Although particular embodiments of the invention have been disclosed herein in detail, this has been done by way of example and for the purposes of illustration only. The aforementioned embodiments are not intended to be limiting with respect to the scope of the invention. It is contemplated by the inventors that various substitutions, alterations, and modifications may be made to the invention without departing from the spirit and scope of the invention.

The invention claimed is:

1. A process for the production of anisotropic coke, the process comprising the steps of:
    (i) providing a purified coal product (PCP), wherein the PCP is in particulate form, and wherein at least about 90% by volume (% v) of the particles are no greater than about 100 μm in diameter; wherein the PCP has an ash content of less than about 10% by mass (% m) and a water content of less than around 5% m;
    (ii) combining the PCP with a feedstock oil in order to create a combined solid-liquid blend, wherein the solid-liquid blend comprises at least around 0.1% m and at most around 50% m PCP;
    (iii) pyrolyzing the solid-liquid blend at a temperature in excess of 400° C. for a time period sufficient to induce formation of mesophase in the solid-liquid blend and form a pyrolyzed solid-liquid blend product, and
    (iv) utilizing the pyrolyzed solid-liquid blend product from step (iii) as a feedstock in a delayed coker to thereby produce an anisotropic coke product.

2. The process of claim 1, wherein at least about 90% by volume (% v) of the PCP particles are no greater than about 75 μm in diameter.

3. The process of claim 1, wherein:
    the PCP has an ash content of less than about 2% m;
    the PCP has a water content of less than around 2% m;
    the PCP has a sulfur content of less than around 3% m; or combinations thereof.

4. The process of claim 1, wherein the feedstock oil comprises an oil having aromatic content.

5. The process of claim 4, wherein the feedstock oil is selected from one or more of the group consisting of: a decanted oil; a heavy oil derived from coal tar; and a heavy oil derived from thermal cracker bottoms.

6. The process of claim 1, wherein the feedstock is introduced into a drum of a delayed coker.

7. The process of claim 1, wherein the feedstock is heated to a temperature of at least 400° C.

8. The process of claim 1, further comprising calcining the anisotropic coke product of step (iv) in order to produce a calcined needle coke.

9. The process of claim 1, wherein the solid-liquid blend comprises at most around 40% m PCP.

10. The process of claim 1, wherein the anisotropic coke product comprises an anisotropic coke yield of greater than 40% by volume of the anisotropic coke product.

11. The process of claim 1, wherein:
    the solid-liquid blend is exposed to a temperature in excess of 450° C.; and
    the anisotropic coke product comprises an anisotropic coke yield of greater than 85% by volume of the anisotropic coke product.

12. A method of increasing the proportion of anisotropic coke produced by a delayed coker process, the method comprising:
    adding a purified coal product (PCP) to a feedstock oil to create a feedstock;
    introducing the feedstock to a delayed coker operating at a temperature in excess of 400° C.; and
    delayed coking the feedstock at the temperature, thereby inducing formation of a mesophase in the feedstock and producing an anisotropic coke product comprising the anisotropic coke, wherein:
    the PCP is in particulate form,
    at least about 90% by volume (% v) of the particles are no greater than about 75 μm in diameter,
    the PCP has an ash content of less than about 10% by mass (% m), and
    the PCP has a water content of less than around 5% m.

13. The method of claim 12, wherein:
    the feedstock oil is a decanted oil or a coal derived oil; and
    the delayed coking process is a delayed needle coker process, such that the feedstock is introduced to a delayed needle coker.

14. The method of claim 12, wherein at least about 90% by volume (% v) of the PCP particles are no greater than about 75 μm in diameter.

15. The method of claim 12, wherein:
    the PCP has an ash content of less than about 2% m;
    the PCP has a water content of less than around 2% m;
    the PCP has a sulfur content of less than around 3% m; or combinations thereof.

16. The method of claim 12, wherein the method results in an increase in the yield of needle coke from the delayed coker process.

17. The method of claim 12, wherein the anisotropic coke product comprises an anisotropic coke yield of greater than 40% by volume of the anisotropic coke product.

18. The method of claim 12, wherein:
 the solid-liquid blend is exposed to a temperature in excess of 430° C.; and
 the anisotropic coke product comprises an anisotropic coke yield of greater than 85% by volume of the anisotropic coke product.

\* \* \* \* \*